United States Patent
Gunell et al.

(10) Patent No.: US 10,968,924 B2
(45) Date of Patent: Apr. 6, 2021

(54) FLUID VALVE ASSEMBLY, PROCESS VALVE POSITIONER AND USE OF A FLUID VALVE ASSEMBLY IN CONTROL OF A PROCESS VALVE

(71) Applicant: Neles Finland Oy, Vantaa (FI)

(72) Inventors: Jan Gunell, Söderkulla (FI); Mika Olkkonen, Vantaa (FI); Juuso Jokinen, Vantaa (FI); Joni Kukkonen, Vantaa (FI); Jyri Hakola, Vantaa (FI)

(73) Assignee: NELES FINLAND OY, Vantaa (FI)

( * ) Notice: Subject to any disclaimer, the term of this patent is extended or adjusted under 35 U.S.C. 154(b) by 98 days.

(21) Appl. No.: 16/088,210

(22) PCT Filed: Mar. 29, 2017

(86) PCT No.: PCT/FI2017/050219
§ 371 (c)(1),
(2) Date: Sep. 25, 2018

(87) PCT Pub. No.: WO2017/168049
PCT Pub. Date: Oct. 5, 2017

(65) Prior Publication Data
US 2019/0271334 A1  Sep. 5, 2019

(30) Foreign Application Priority Data
Mar. 30, 2016 (FI) .................................... 20165267

(51) Int. Cl.
*F15B 13/04* (2006.01)
*F16K 11/00* (2006.01)
(Continued)

(52) U.S. Cl.
CPC .......... *F15B 13/042* (2013.01); *F16K 11/048* (2013.01); *F16K 11/161* (2013.01);
(Continued)

(58) Field of Classification Search
CPC .... F16K 11/048; F16K 11/027; F16K 11/161; F16K 11/04; F16K 31/126;
(Continued)

(56) References Cited

U.S. PATENT DOCUMENTS 2,866,476 A  12/1958 Orloff
3,415,284 A  12/1968 Stampfli
(Continued)

FOREIGN PATENT DOCUMENTS

CN  1129480 A  8/1996
DE  4214661 A1  11/1993
(Continued)

OTHER PUBLICATIONS

Mar. 14, 2019 Extended European Search Report issued in European Patent Application No. 17773367.2.
(Continued)

*Primary Examiner* — Kelsey E Cary
(74) *Attorney, Agent, or Firm* — Oliff PLC

(57) ABSTRACT

A fluid valve assembly having a central bore and a stem axially-movable within the central bore and actuated by an axial pilot force and an axial counter force. An inner supply pressure chamber is provided to retain a stabilized supply pressure providing the axial counter force affecting on the stem. A seal member is arranged coaxially with the stem between the inner supply pressure chamber and an outer supply pressure chamber which is connected to a supply pressure input line. A metering edge is arranged coaxially with the stem to control fluid flow from the outer supply pressure chamber to an actuator chamber. Means are provided to stabilize the supply pressure in the inner chamber against sudden pressure drops in the outer supply pressure chamber.

17 Claims, 9 Drawing Sheets

(51) Int. Cl.
  *F15B 13/042* (2006.01)
  *F16K 11/048* (2006.01)
  *F16K 11/16* (2006.01)
  *F16K 27/02* (2006.01)
  *F16K 31/126* (2006.01)
  *F16K 31/128* (2006.01)
  *F16K 31/40* (2006.01)

(52) U.S. Cl.
  CPC ........ *F16K 27/0263* (2013.01); *F16K 31/128* (2013.01); *F16K 31/1262* (2013.01); *F16K 31/1266* (2013.01); *F16K 31/402* (2013.01)

(58) Field of Classification Search
  CPC ............. F16K 31/1262; F16K 31/1245; F16K 31/1266; F16K 31/1268; F16K 31/128; F16K 31/1223; F16K 31/402; F16K 27/0263; F15B 13/0426; F15B 13/042; F15B 13/0405; Y10T 137/86582; Y10T 137/86678; Y10T 137/86686
  See application file for complete search history.

(56) References Cited

U.S. PATENT DOCUMENTS

| | | | |
|---|---|---|---|
| 3,424,057 A | 1/1969 | Schweizer | |
| 3,646,969 A | 3/1972 | Stampfli | |
| 3,785,392 A | 1/1974 | Baker | |
| 3,868,969 A | 3/1975 | Schwenk | |
| 3,910,303 A * | 10/1975 | Rydberg | F16K 11/048 137/112 |
| 4,219,181 A | 8/1980 | Joelson | |
| 4,316,599 A | 2/1982 | Bouvet et al. | |
| 4,445,333 A | 5/1984 | Coleman | |
| 4,574,844 A | 3/1986 | Neff et al. | |
| 5,014,747 A | 5/1991 | Suzuki et al. | |
| 5,042,832 A | 8/1991 | Takahashi et al. | |
| 5,174,338 A | 12/1992 | Yokota et al. | |
| 5,261,455 A | 11/1993 | Takahashi et al. | |
| 5,261,458 A | 11/1993 | Johnson et al. | |
| 5,372,196 A | 12/1994 | Andersson | |
| 5,562,125 A | 10/1996 | Bray | |
| 5,899,231 A | 5/1999 | Drori | |
| 5,913,577 A | 6/1999 | Arndt | |
| 6,237,635 B1 | 5/2001 | Nambu | |
| 6,276,385 B1 | 8/2001 | Gassman | |
| 6,957,127 B1 | 10/2005 | Smart et al. | |
| 7,458,310 B2 | 12/2008 | Junk | |
| 8,522,818 B2 | 9/2013 | Tondolo | |
| 2008/0169439 A1 | 7/2008 | Waterstredt et al. | |

FOREIGN PATENT DOCUMENTS

| | | |
|---|---|---|
| FI | 20155177 A | 9/2016 |
| FR | 2303217 A1 | 10/1976 |
| GB | 1153456 A | 5/1969 |
| GB | 2154707 A | 9/1985 |
| JP | S49-43619 B1 | 11/1974 |
| JP | S52-029582 A | 3/1977 |
| JP | S52-31930 U | 3/1977 |
| JP | H04-266676 A | 9/1992 |
| JP | H09-236186 A | 9/1997 |
| JP | H10-288273 A | 10/1998 |
| JP | 2002-081557 A | 3/2002 |
| JP | 2002-243059 A | 8/2002 |
| WO | 2014/080664 A1 | 5/2014 |
| WO | 2016/146890 A1 | 9/2016 |

OTHER PUBLICATIONS

Mar. 21, 2019 Office Action issued in U.S. Appl. No. 15/556,141.
Apr. 24, 2018 Search Report issued in Finnish Patent Application No. 20165267.
Oct. 21, 2016 Search Report issued in Finnish Patent Application No. 20165267.
Jun. 21, 2017 International Search Report issued in International Patent Application No. PCT/FI2017/050219.
Jul. 19, 2018 International Preliminary Report on Patentability issued in International Patent Application No. PCT/FI2017/050219.
May 10, 2016 International Search Report issued in International Patent Application No. PCT/FI2016/050159.
May 10, 2016 Written Opinion issued in International Patent Application No. PCT/FI2016/050159.
Oct. 2, 2015 Search Report issued in Finnish Patent Application No. 20155177.
Mar. 1, 2018 Extended Search Report issued in European Patent Application No. 16 764 286.7.
Sep. 4, 2018 Office Action issued in Japanese Patent Application No. 2017-548429.
Oct. 23, 2018 Office Action issued in Chinese Patent Application No. 201680016427.8.
Oct. 1, 2019 Office Action issued in Japanese Patent Application No. 2018-551436.

\* cited by examiner

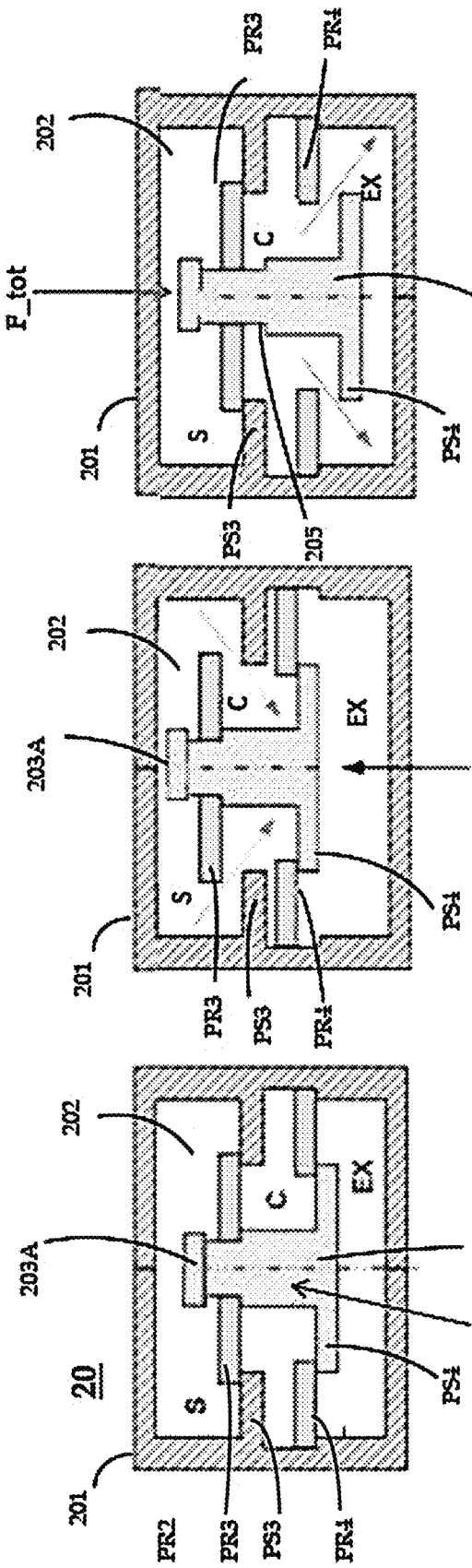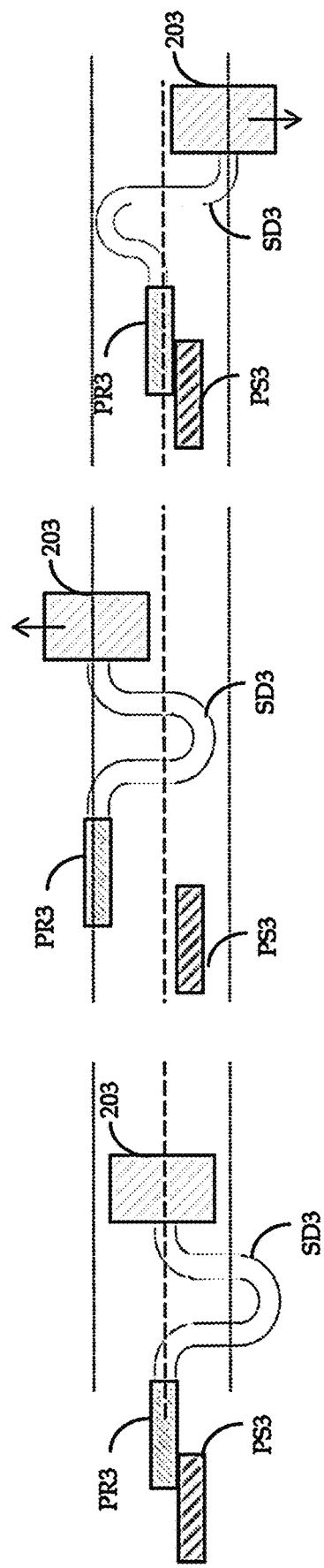

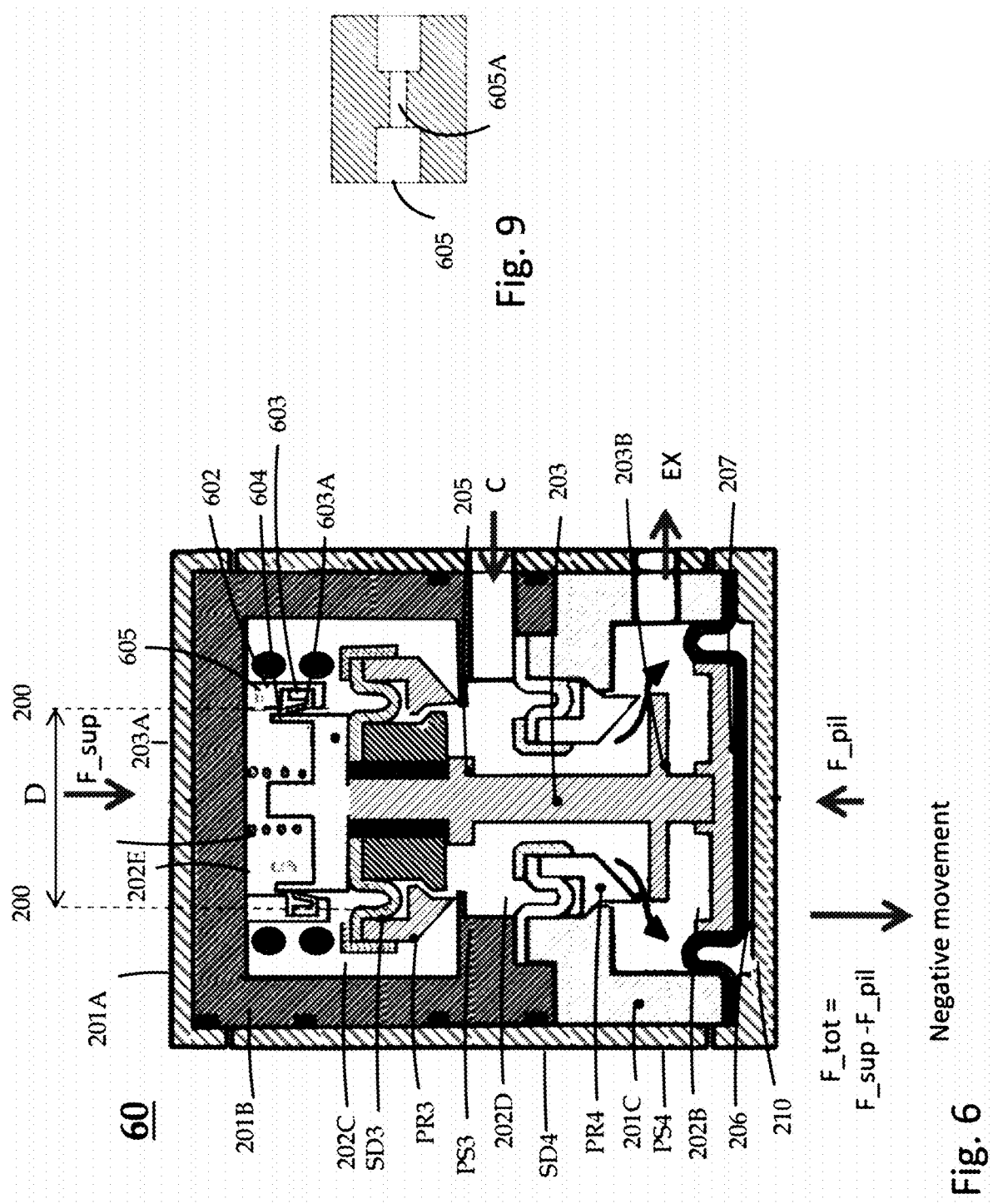

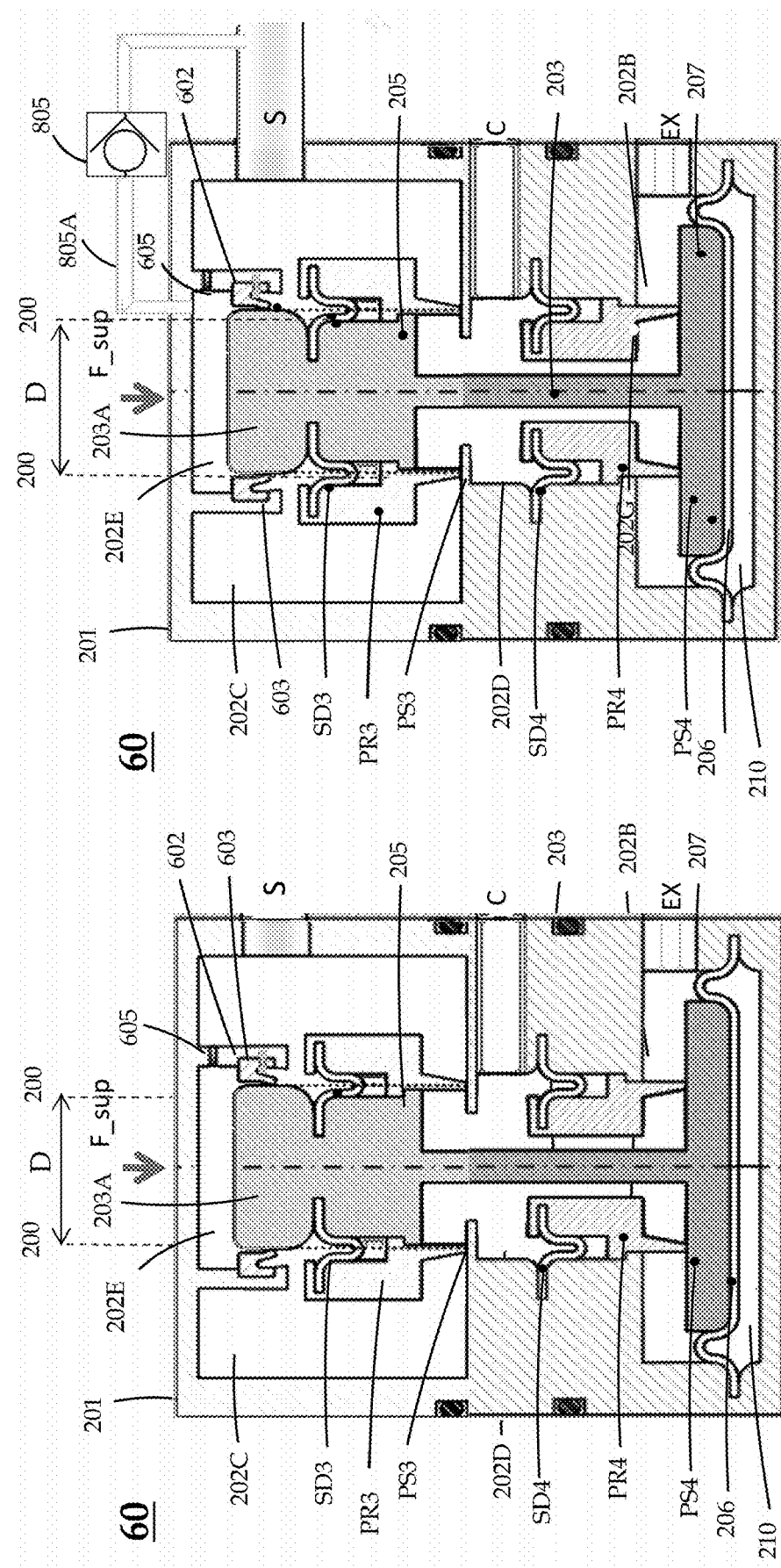

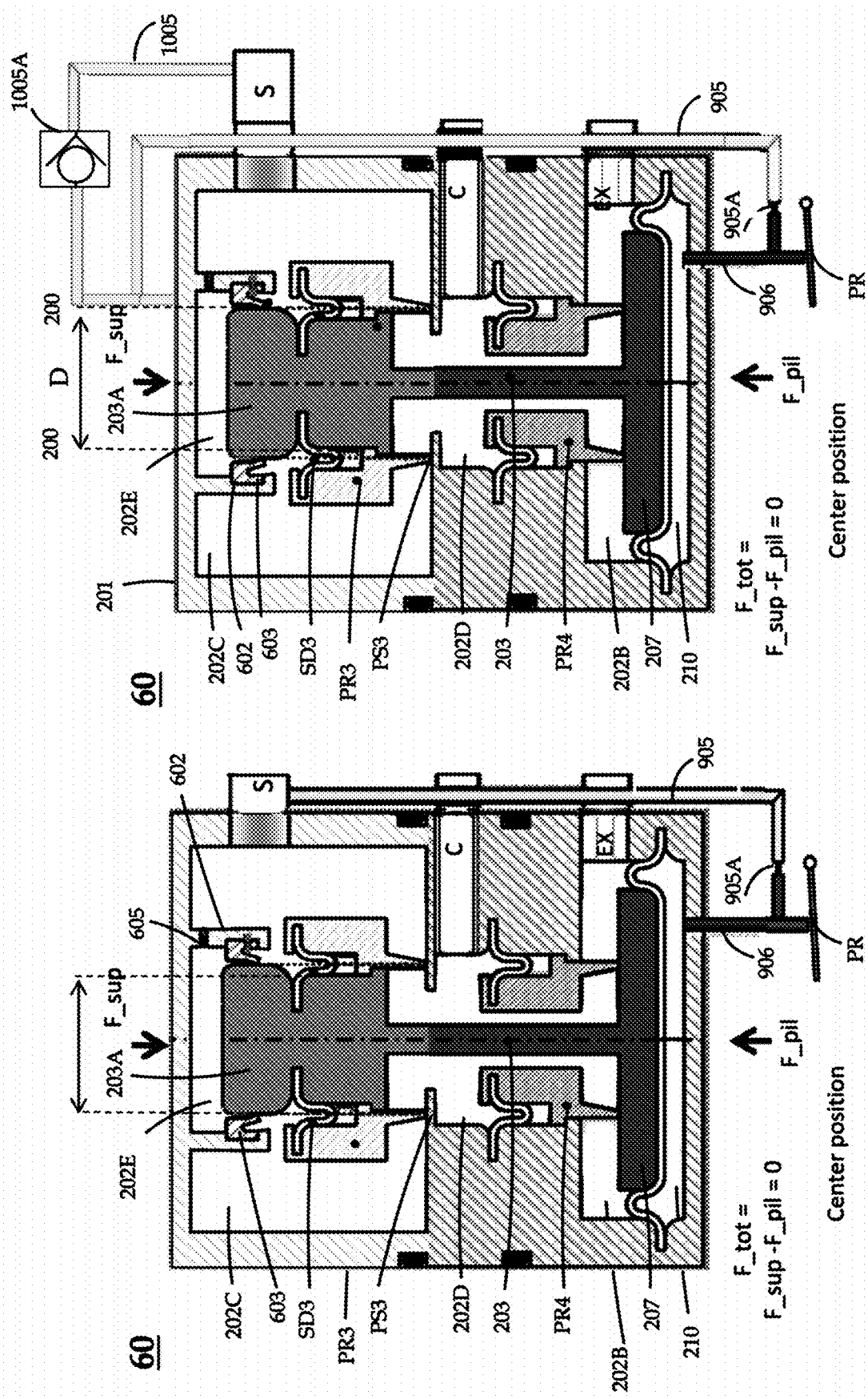

FLUID VALVE ASSEMBLY, PROCESS VALVE POSITIONER AND USE OF A FLUID VALVE ASSEMBLY IN CONTROL OF A PROCESS VALVE

FIELD OF THE INVENTION

The invention relates to controlling fluid actuators, particularly pneumatic and hydraulic actuators.

BACKGROUND OF THE INVENTION

Actuators are frequently used as mechanisms to introduce motion or control motion. It is operated by a source of energy, typically electric current, hydraulic fluid pressure, or pneumatic fluid pressure, and converts that energy into motion of a target mechanism, such as into movement of a closure element of a control valve.

A control valve is generally used for a continuous control of a liquid or gas flow in different pipelines and processes. In a processing industry, such as pulp and paper, oil refining, petrochemical and chemical industries, different kinds of control valves installed in a plant's pipe system control material flows in the process. A material flow may contain any fluid material, such as fluids, liquors, liquids, gases and steam. The control valve is usually connected with an actuator, which moves the closing element of the valve to a desired position between fully open and fully closed positions. The actuator may be a pneumatic cylinder-piston device, for example. The actuator, for its part, is usually controlled by a valve positioner, also called as a valve controller, which controls the position of the closing element of the control valve and thus the material flow in the process according to a control signal from a process controller.

Valves generally applied in the industry are often operated by means of pneumatic actuators. These actuators convert a pneumatic pressure into valve stem motion by pressure acting on a diaphragm or piston connected to the stem. The actuators can be either single-acting or double-acting. With the single-acting devices, movement in the opposite direction is effected by a spring, compressed air working against the spring. When air pressure closes the valve and spring action opens the valve, the actuator is termed direct acting. When air pressure opens the valve and spring action closes the valve, the actuator is termed reverse acting. Double-acting actuators have air supplied to both sides of the diaphragm or the piston. The differential pressure across the diaphragm or the piston positions the valve stem. Automatic operation is provided when the pneumatic signals are automatically controlled by circuitry. Semi-automatic operation is provided by manual switches in the circuitry to the air control valves. Also hydraulic actuators may be employed for positioning of the valve similar to the pneumatic actuators, but now a hydraulic fluid is used instead of air or a pneumatic fluid.

A valve positioner can typically receive control commands over a digital fieldbus or as an analog 4 . . . 20 mA control signal. Highway Addressable Remote Transducer (HART) protocols allow transmission of digital data together with a conventional 4 to 20 mA analog signal. Other examples of fieldbuses are Fieldbus and Profibus. Typically all electric power to a positioner is taken from the fieldbus or the 4 . . . 20 mA control signal. A separate electric power supply to a positioner is not desired, because this would require a separate cabling. A positioner may include an electronic unit having an electrical control output and a pneumatic or hydraulic unit that takes in the electrical control signal and converts it to a corresponding fluid pressure output to an actuator. This is often referred to as a current-to-pressure (VP) conversion. The pneumatic or hydraulic unit may comprise a prestage and an output stage. Because the electric power available from the fieldbus or analog current loop is very limited, the prestage may first convert the electrical control signal into a small pilot fluid pressure which is sufficient to control the output stage. The output stage is connected to a supply fluid pressure and amplifies the small pilot pressure signal into a larger fluid pressure output signal used by the actuator. The output stage is often referred to as a pressure amplifier, a pressure booster, or a pressure relay.

Pneumatic output stages used in positioners can coarsely be grouped into spool valve assemblies and poppet valve assemblies. A simplified design example of a 5/3 spool valve (5 ports/3 states) for controlling a double-action actuator is illustrated in FIG. 1A and the corresponding schematic symbol FIG. 1B. In an output stage of a spool valve type the only moving part is a spool 6 which moves within a central bore in a valve body 7 and controls an air flow from a supply pressure port 1 to the actuator ports 2, 4, and from the actuator ports 2,4 to exhaust ports 3 and 5. Due to the structure of the spool valve, there is always a supply air leakage through the valve. The strict tolerances make manufacturing techniques of spool valves very demanding. Generally, the output stage of a spool valve type is not robust to changes in operating environment and in manufacturing.

An output stage with a poppet valve design has got higher number of moving parts than a spool valve. However, the larger tolerances and clearances allowed for the spool valve parts make it possible to utilize an economical mass production and modern manufacturing techniques. A simplified design example of a conventional 4/2 poppet valve (4 ports/2 states) for controlling a double-action actuator is illustrated in FIG. 1C and the corresponding schematic symbol in FIG. 1 D. As can be seen, in a conventional poppet valve assembly two separate poppet valves 8 and 9 are required to control an air flow from a supply pressure port 1 to the actuator ports 2,4, and from the actuator ports 2,4 to the exhaust port 3. In the conventional output stage illustrated in FIG. 1C the controllability with a single pilot pressure is poor, since the movements of the poppet valves 8 and 9 are not mechanically connected to each other. U.S. Pat. No. 6,276,385 discloses an output stage wherein the movement of poppet valves are together by an actuation beam to move in unison, but in opposing directions. The actuation beam is a rocker arm rotating upon a central pivot. The movement of poppet valves is now synchronized.

Both in the conventional output stage illustrated in FIG. 1C and in the output stage of U.S. Pat. No. 6,276,385 the control of the poppet valves requires very large forces to overcome the pressure forces. The threshold force required to open a poppet valve becomes large and introduces a significant point of discontinuation within the control region. This characteristic of prior art output stages of poppet valve type makes the control of the output stage significantly more difficult.

Examples of 3/2 output stages (3 ports/2 states) of poppet valve type for a single-action actuator are disclosed in U.S. Pat. Nos. 6,276,385, 6,957,127, 8,522,818, 7,458,310, and 5,261,458.

BRIEF DESCRIPTION OF THE INVENTION

An aspect of the present invention is to provide a fluid valve assembly or an output stage with new design.

An aspect of the invention is a fluid valve assembly and a valve positioner as defined in the independent claims. Embodiments of the invention are disclosed in the dependent claims.

An aspect of the invention is a fluid valve assembly for connection to a supply of fluid under pressure for providing an actuator, particularly a hydraulic or pneumatic actuator, with a actuator fluid pressure, comprising:

a valve body with a central bore, the central bore comprising an inner supply pressure chamber, an outer supply pressure chamber connected to a supply pressure input line; an actuator chamber; and an exhaust chamber;

a stem axially-movable within said central bore and actuated by an axial pilot force and an axial counter force affecting on the stem;

a metering edge and a counteracting metering edge arranged coaxially with and controlled by the stem and arranged to control fluid flow from the outer supply pressure chamber to the actuator chamber and from the actuator chamber to the exhaust chamber, respectively;

a seal member arranged coaxially with the stem between the outer supply pressure chamber and the inner supply pressure chamber;

the inner supply pressure chamber being arranged to retain a stabilized supply pressure providing the axial counter force affecting on the stem within the inner supply pressure chamber; and means for stabilizing the supply pressure in the inner chamber.

In an embodiment, the means for stabilizing the supply pressure in the inner chamber comprise a restricted flow path between the inner supply pressure chamber and the outer supply pressure chamber.

In an embodiment, the restricted flow path is arranged to lower the stabilized supply pressure retained in the inner supply pressure chamber to the supply pressure in the outer supply pressure chamber with a predetermined rate.

In an embodiment, the restricted flow path is arranged to raise the stabilized supply pressure retained in the inner supply pressure chamber at a predetermined rate, if the supply pressure in the outer supply pressure chamber is higher than the stabilized supply pressure retained in the inner supply pressure chamber.

In an embodiment, the restricted flow path comprises a flow restrictor.

In an embodiment, the flow restrictor is a flow orifice restrictor, preferably with an orifice diameter of from about 0.1 mm to about 0.5 mm, more preferably from about 0.2 mm to about 0.3 mm.

In an embodiment, the means for stabilizing the supply pressure in the inner chamber comprise a check valve or a like flow control device configured to block a sup-ply pressure flow path between the inner supply chamber and the outer supply chamber, if the pressure in the outer supply chamber drops below the stabilized supply pressure retained in the inner supply chamber, and arranged to open the supply pressure flow path otherwise.

In an embodiment, the seal member comprises a lip seal, a ring seal, a sealing diaphragm or sealing bellows.

9 In an embodiment, the seal member is an annular lip seal arranged to seal the inner supply pressure chamber from the outer supply pressure chamber, if the pressure in the outer supply pressure chamber drops below the stabilized supply pressure retained in the inner supply pressure chamber, and arranged to pass the supply pressure from the outer supply pressure chamber to the inner supply pressure chamber to raise the stabilized supply pressure retained in the inner supply pressure chamber, if the supply pressure in the outer supply pressure chamber is higher than the stabilized supply pressure retained in the inner supply pressure chamber.

In an embodiment, the fluid valve assembly comprises a further restricted flow path from the supply pressure inlet of the outer supply pressure chamber to a prestage which controls a pilot pressure and thereby the axial pilot force.

In an embodiment, the restricted flow path and the further restricted flow path are dimensioned so that a rate of change of the axial counter force and the rate of change of the pilot force due to a change in the supply pressure in the outer supply pressure chamber are approximately equal.

In an embodiment, the means for stabilizing the supply pressure in the inner chamber comprise a check valve or a like flow control device configured to block a sup-ply pressure flow path between the inner supply chamber and the outer supply chamber, if the pressure in the outer supply chamber drops below the stabilized supply pressure retained in the inner supply chamber, and arranged to open the supply pressure flow path otherwise.

In an embodiment, the means for stabilizing the supply pressure in the inner chamber comprise a check valve or a like flow control device configured to block a sup-ply pressure flow path between the inner supply chamber and the outer supply chamber, if the pressure in the outer supply chamber drops below the stabilized supply pressure retained in the inner supply chamber, and arranged to open the supply pressure flow path otherwise, and comprising a restricted flow path from the inner supply pressure chamber to a prestage which controls a pilot pressure and thereby the axial pilot force.

In an embodiment, one of the metering edge and the counteracting metering edge comprises a poppet ring supported by flexible element to the stem and the respective mating seat surface on a valve body, and the other one of the metering edge and the counteracting metering edge comprises a poppet ring supported by a flexible element to the valve body and the respective mating seat surface on the stem, the support arrangement allowing a relative axial movement of the poppet ring and the supporting valve body or stem also in a closed state of the respective metering edge.

In an embodiment, each of the flexible elements comprises a respective sealing element, preferably a sealing diaphragm or sealing bellows.

Another aspect of the invention is a process valve positioner comprising an electronic unit with an electrical control output, and a pneumatic or hydraulic unit arranged to convert the electrical control output to a corresponding fluid pressure output to an actuator, said pneumatic or hydraulic unit comprising a fluid valve assembly according to any one of claims 1-15.

In an embodiment, the pneumatic or hydraulic unit comprises a prestage and an output stage, the prestage being arranged to convert the electrical control output into a pilot pressure which is sufficient to control the output stage, the output stage comprising a fluid valve assembly according to embodiments of the invention.

Still another aspect of the invention is a use of a fluid valve assembly according to embodiments of the invention in controlling of a process valve.

BRIEF DESCRIPTION OF THE DRAWINGS

In the following, the invention will be described by means of exemplary embodiments with reference to the attached drawings, in which

FIGS. 2A, 2B and 2C illustrate schematically a fluid valve assembly according to exemplary embodiments of the invention in three positions of the stem;

FIGS. 4A, 4B and 4C illustrate schematically an example of the flexible support of a poppet ring to the stem in three positions of the stem;

FIGS. 6, 7 and 8 illustrate schematically a fluid valve assembly according to still further exemplary embodiments;

FIG. 9 illustrates schematically an example of a flow restrictor;

FIGS. 10A and 10B illustrate schematically fluid valve assemblies according to further exemplary embodiments with a pilot pressure stabilization;

EXAMPLE EMBODIMENTS OF THE INVENTION

In co-pending Finnish patent application FI20155177 having the same assignee, a fluid valve assembly or an output stage is disclosed that provides various improved features. The disclosure of FI20155177 is incorporated by reference herein to provide more detailed description on fluid valve assembly structures wherein principles and embodiments of the present invention may be applied to. A fluid valve assembly of the type disclosed in FI 20155177 can be implemented with poppet-type valves or the like. A poppet-type valve assembly can, unlike a spool valve, be made practically leak-free without using soft sealings which are prone to wearing. The manufacturing technique required is not as demanding as that of a small-clearance spool valve. Despite of the higher number of components, the manufacturing costs are competitive. Metering edges of a valve assembly may be mechanically coupled together by a stem and supported by flexible elements. The axial relative movement of the metering edges and the stem or a valve body can be allowed in the closing direction also upon they have reached their closed positions. In a conventional poppet valve, when the valve is closed, the movement of the poppet cannot be continued in the closing direction. This enables an accurate control of a poppet valve with one pilot force, such as with one pilot pressure.

In FIGS. 2A, 2B and 2C, a fluid valve assembly 20 which can be connected to a supply of fluid under pressure for providing an actuator with a control fluid pressure, according to an exemplary embodiment of the invention is illustrated schematically.

Figure 3:
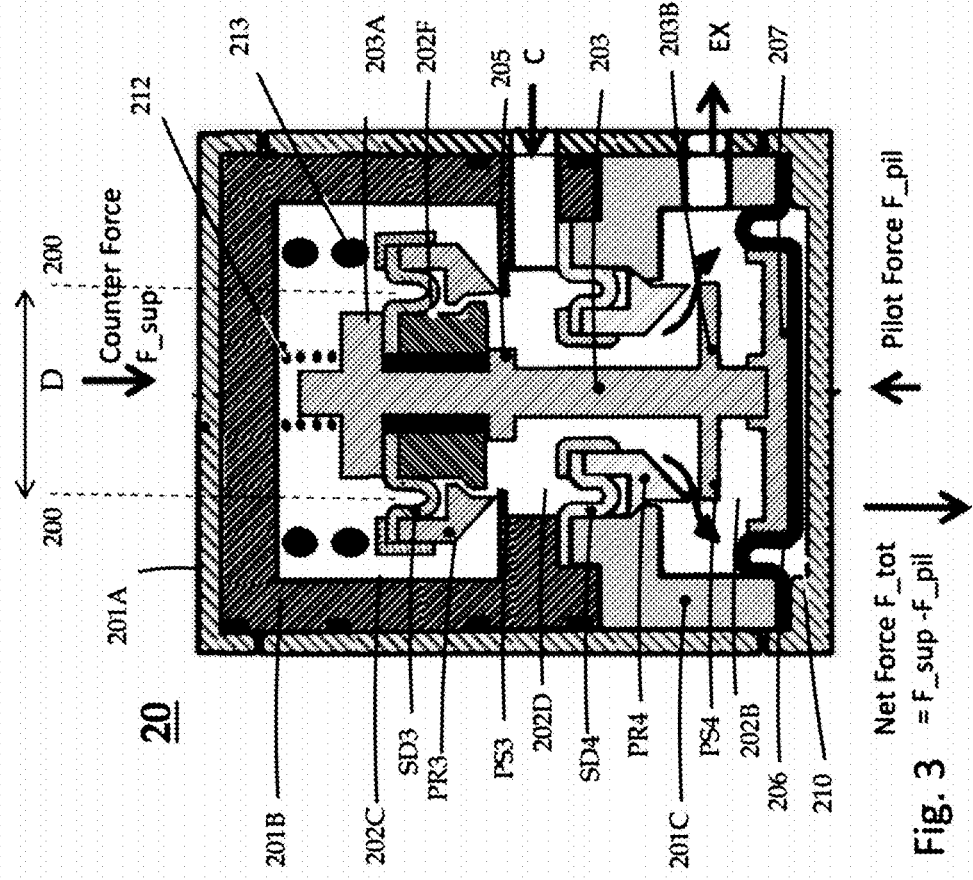
FIG. 3 illustrates schematically a fluid valve assembly according to further exemplary embodiments.

In FIG. 3, a fluid valve assembly 20 according to further exemplary embodiments is illustrated schematically in more detail. Same reference symbols in FIGS. 2A, 2B, 2C, and 3 refer to the same or corresponding elements, structures, functionalities and features.

In the exemplary embodiments, a 3/3 valve assembly with three ports and three positions or states for controlling a single-acting actuator or a corresponding device is illustrated. However, same principles can be applied also to valve assemblies with other number of ports and/or positions or states.

The valve assembly 20 comprises an elongated frame or body 201 having an axial central bore or chamber 202 with a supply port S or a supply chamber 202C for receiving a supply of fluid under pressure, an actuator port C or an actuator chamber 202D for providing a control fluid pressure to a single-acting actuator, and an exhaust port EX or an exhaust chamber 202B for venting (e.g. to environment) the fluid pressure from the actuator port C.

According to an aspect of the invention a stem 203 is provided within the valve body 201 to move in an axial direction in the central bore 202. The stem 203 may comprise two or more parts arranged to form a single rigid stem when installed in the valve assembly. The stem 203 extends through a plurality of poppet rings PR3 and PR4 arranged at axially spaced locations within the central bore 202. Each poppet ring PR3 and PR4 is arranged coaxially with the stem 203 to cooperate with a respective mating seat surface PS3 and PS4 to form a respective metering edge (which may be alternatively called a control edge) PR3/PS3 and PR4/PS4 forming control orifices (illustrated by arrows in FIGS. 2B, 2C) for controlling fluid flow between the actuator port C (the actuator chamber 202D) and one of the supply S (the supply chamber 202D) and exhaust ports EX (the exhaust chamber 202B). In a closed position of a metering edge, when a poppet ring is pressed against a respective mating seat surface, there is substantially no fluid flow through the metering edge. It should be appreciated that some fluid flow or fluid leakage may be allowed in some embodiments although the metering edge is considered to be closed. In an open position of a metering edge, when a poppet ring is separated from a respective mating seat surface and an orifice is opened between them, a fluid flow through the metering edge is allowed.

According to an aspect of the invention, metering edges PR3/PS3 and PR4/PS4 of the valve assembly 20 are mechanically tied together by the stem 203 and supported by flexible elements SD3 and SD4. The axial relative movement of the metering edges and the stem 203 or the body 201 is allowed in the closing direction also upon they have reached their closed positions. In a conventional poppet valve, when the valve is closed, the movement of the poppet cannot be continued in the closing direction. This enables an accurate control of a poppet valve.

According to an aspect of the invention, a pair of counter-acting metering edges is provided for the actuator port C such that both metering edges of the counter-acting pair are closed in a centre position of the stem, one metering edge is closed and the other metering edge of the counter-acting pair is opened with the movement of the stem 203 to a first axial direction, and the one metering edge is opened and the other metering edge of the counteracting pair is closed with the movement of the stem 203 to an opposite second axial direction.

A poppet-type valve assembly can, unlike a spool valve, be made practically leak-free without using soft sealings which are prone to wearing. The manufacturing technique required is not as demanding as that of a small-clearance spool valve. Despite of the higher number of components, the manufacturing costs are competitive.

In an embodiment, each poppet ring PR3 and PR4 arranged coaxially with the stem 203 is supported by a respective flexible element SD3 and SD4 to the body 201 or the stem 203 so that the axial relative movement of the poppet rings PR3 and PR4 and the stem 203 or the body 201 in the closing direction is allowed also upon the poppet rings have reached their closed positions.

In an embodiment, the flexible element SD3 and SD4 is an annular sealing diaphragm or an annular sealing bellows, such as illustrated in the examples of FIG. 3, and FIGS. 4A, 4B and 4C.

In an embodiment, each poppet ring PR3 and PR4 has a respective mating seat surface PS3 and PS4 formed by a larger diameter section of the stem 203, such as shoulder or flange, or formed by a body section protruding radially into the central bore 202 thereby providing a smaller diameter section of the central bore 202, such as an inward shoulder or flange of the body 201.

In an embodiment of the invention, the poppet ring PR4 is supported to the valve body 201 by a flexible element SD4 at its outer circle, while its inner circle is free. The poppet ring PR4 may protrude radially inwards to the central bore 202 and have a respective mating seat surface PS4 formed by respective larger diameter end section 203B of the stem 203. The poppet ring PR3 is supported to the stem 203 by a respective flexible element SD3 at its inner circle, while its outer circle is free. The poppet ring PR3 has a respective mating seat surface PS3 formed on the valve body 201.

According to an aspect of the invention, a pair of counter-acting metering edges PR3/PS3 and PR4/PS4 is provided for the actuator port C such that both metering edges of the counter-acting pair are closed in a centre position of the stem, one metering edge is closed and the other metering edge of the counter-acting pair is opened with the movement of the stem 203 to a first axial direction, and the one metering edge is opened and the other metering edge of the counter-acting pair is closed with the movement of the stem 203 to an opposite second axial direction.

In an embodiment, the metering edge PR3/PS3 controls the fluid flow between the actuator port C (the actuator chamber 202D) and the supply port S (the supply chamber 202C), and the metering edge PR4/PS4 controls the fluid flow between the actuator port C (the actuator chamber 202D) and the exhaust port EX (the exhaust chamber 202B).

In alternative embodiments, all poppet rings may be supported by respective flexible sealing elements to the stem 202, in a similar manner as the poppet ring PR3, and all mating seat surfaces may be arranged on the valve body 201, in a similar manner as the mating seat surface PS3. In further alternative embodiments, all poppet rings may be supported by respective flexible sealing elements to the valve body 201, in a similar manner as the poppet ring PR4, and all mating seat surfaces may be arranged on the stem 203, in a similar manner as the mating seat surface PS4. However, in this case some of the poppet rings would not be on the higher pressure side of the respective metering edge which may cause problems in a flow control and in a pressure-balancing.

In an embodiment, pre-loaded elastic elements, such as springs, are provided to make the closing forces for the metering edges. For example, one or more pre-loaded springs 213 may be arranged around the stem 203 between the top of body 201 and the poppet ring PR3 to exert an axial closing force on the poppet ring PR3 and to press it against the mating seat surface PS3. Similarly, there may be one or more pre-loaded springs around the stem 203 in the central bore 202 at the actuator port C (the actuator chamber 202D) to abut the poppet ring PR4 at other end and to a suitable support element, such as a shoulder, on the body 201 or the stem 203 at the other end. However, it should be appreciated that a specific technique by which the closing forces are created is not essential to the basic invention.

In the closed centre position of the stem 203 illustrated in FIG. 2A, there is no axial net force F_tot that would displace the stem 203 from the center position in the axial direction. All metering edges PR3/PS3 and PR4/PS4 are closed, i.e. each poppet ring PR3 and PR4 is pressed against its respective mating seat surface PS3 and PS4. There is no fluid flow between the ports EX, C and S (i.e. the chambers 202B, 202C and 202D). FIGS. 4A, 4B and 4C illustrate schematically an example of implementation of the flexible support SD3 for the poppet ring PR3 to the stem 203. The flexible support SD3 may be in form of a folded annular sealing diaphragm having an inner circle fixed to the outer periphery of the stem 203 and having an outer circle fixed to the inner circle of the poppet ring PR3. The mating seat surface PS3 is a fixed surface on the valve body 201. In the FIG. 4A, the U-shaped fold of the sealing diaphragm SD1 is approximately or nearly undeformed and the poppet ring PR3 rests against the mating seal surface PS3. It should be appreciated that the closed position of a metering edge may comprises a subrange of the total movement, for example 10 percentage of the total movement, and therefore the sealing diaphragm may be slightly deformed, i.e. approximately or nearly undeformed.

The axial net force F_tot may be formed by an axial pilot force F_pil affecting on one end of the stem 203 and an axial counter force F_sup affecting on the opposite end of the stem 203. In an exemplary embodiment, the pilot force F_pil may be provided by a pilot fluid pressure which in a pilot pressure chamber 210 affects on a pilot diaphragm 206 and a piston 207 arranged at one end of the stem 203, as illustrated in FIG. 3.

The axial net force F_tot is zero when the axial pilot force F_pil and the axial counter force F_sup are equal, and the valve assembly is in a closed center position illustrated in FIG. 2A. The actuator does not move (for example, a control valve maintains its present opening). When the axial pilot force F_pil increases to be larger than the axial counter force F_sup, a positive axial net force F_tot is created, and the stem 203 moves upwards (to a positive direction) as illustrated in FIGS. 2B, 3 and 4B. An engagement element 205, such as a shoulder, in the stem 203 engages to the poppet ring PR3 and moves it upwards thereby opening the third metering edge PR3/PS3, and the fluid flows from the supply port S to the actuator port C. In the examples shown in FIGS. 3A and 4B, the U-shaped fold of the sealing diaphragm SD3 assumes or maintains approximately undeformed shape, because the poppet ring PR3 can move freely with the stem 203. At the same time the counteracting metering edge PR4/PS4 is maintained closed as the upwards-moving seat surface PS4 of the stem 203 engages and moves upwards the poppet ring PR4, which is flexibly supported to the body 20. In the example shown in FIG. 3A, the U-shape of the sealing diaphragm SD4 is deformed to allow the movement of the poppet ring PR4 in relation to the body 201. Also the seat surface PS1 of the stem 203 moves upwards and is separated from the poppet ring PR1 thereby opening the first metering edge PR1/PS1, and the fluid flows from the actuator port C1 to the exhaust port EX1. In the examples shown in FIG. 3A, the U-shaped fold of the sealing diaphragm SD1 is approximately undeformed. At the same time, the poppet ring PR2, since it is flexibly supported to the stem 203, is maintained stationary against the mating seat surface PS2 on the body 201 while the stem 203 is moving upwards through the poppet ring PR2. Thus, the metering edge PR2/PS2 is maintained closed. In the example shown in FIG. 3A, the U-shape of the sealing diaphragm SD2 is deformed to allow the movement of the poppet ring PR2 relative to the stem 203. The actuator moves in a first direction (e.g. towards 100% opening of a control valve).

Starting from the position illustrated in FIGS. 2B and 4B, when the axial pilot force F_pil decreases to be equal to and then smaller than the axial counter force F_sup, the positive axial net force F_tot is first decreased and then a negative axial net force F_tot is created, and the stem 203 moves downwards (to a negative direction) as illustrated in FIGS. 2C, 3 and 4C, the seat surface PS4 of the stem 203 moves downwards and is separated from the poppet ring PR4 thereby opening the metering edge PR4/PS4, and the fluid flows from the actuator port C to the exhaust port EX. In the example shown in FIG. 3, the U-shape of the sealing diaphragm SD4 is restored to the original, approximately or nearly undeformed shape with the downward movement of the poppet ring PR4 relative to the body 201. At the same time, the poppet ring PR3, since it is flexibly supported to the stem 203, moves against the mating seat surface PS3 on the body 201 and stops there while the stem 203 is moving downwards. Thus, the metering edge PR3/PS3 is closed. In the examples shown in FIGS. 3 and 4C, the U-shape of the sealing diaphragm SD3 is deformed to allow the upward movement of the poppet ring PR3 relative to the stem 203. The actuator moves in a second direction (e.g. towards 0% opening of a control valve).

According to an aspect of the invention, the poppet rings PR3 and PR4 may be pressured-balanced. A pressure-balanced poppet ring may be dimensioned and shaped such that the fluid pressure forces exerted on the poppet ring are compensated to make the resultant fluid pressure force affecting on the respective metering edge very small or zero. As a result, the control forces required to move the stem are only fraction of the control forces required in unbalanced poppet valve assemblies. This provides a possibility to control the stem 203 faster than in the prior art poppet valves (resulting in a better control) or with a smaller pilot pressure (resulting in a lower energy need of a controller). The compensation of the fluid pressure forces results also in a linear operation of the stem 203 over a control range. In the prior art solutions the uncompensated high fluid pressure forces induce a significant discontinuation point (a large dead zone) exactly in the middle of the control range. Therefore, the pressure-balanced poppet rings result in a significantly better controllability of a poppet valve assembly according to an exemplary embodiment in comparison with the prior art poppet valve assemblies. This allows employing a high-capacity output stage also for controlling small actuators without a loss in the control accuracy of a process valve.

Figure 1B:
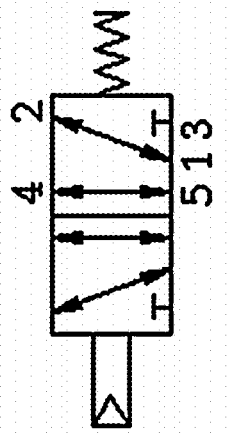
FIGS. 1A and 1B illustrate a simplified example of a prior art 5/3 spool valve and the corresponding schematic symbol, respectively.
Figure 1D:
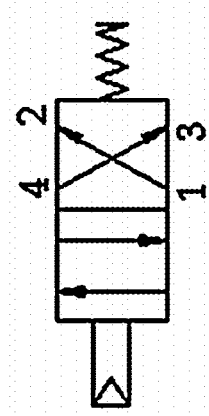
FIGS. 1C and 1D illustrate a simplified example of a prior art 4/2 poppet valve and the corresponding schematic symbol, respectively.
Figure 1A:
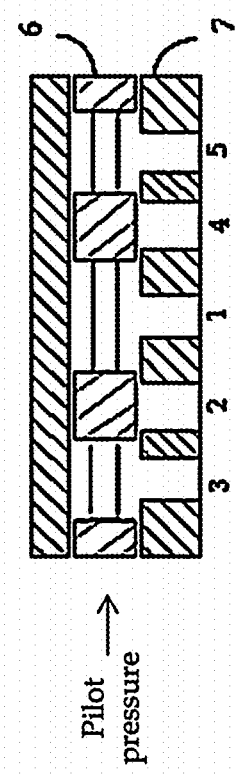
Figure 1C:
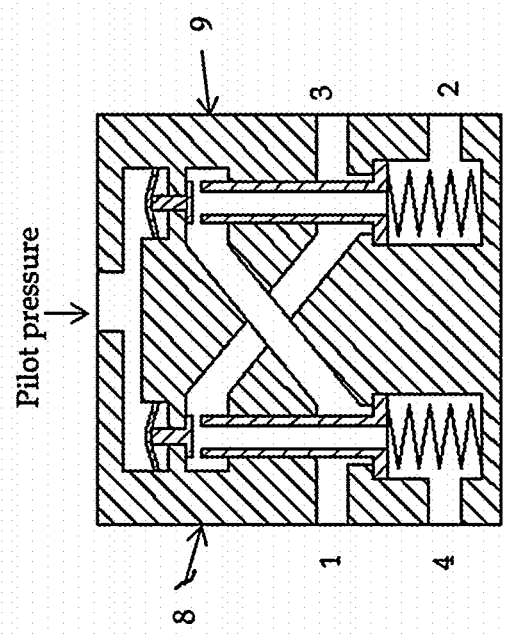
Figure 5A:
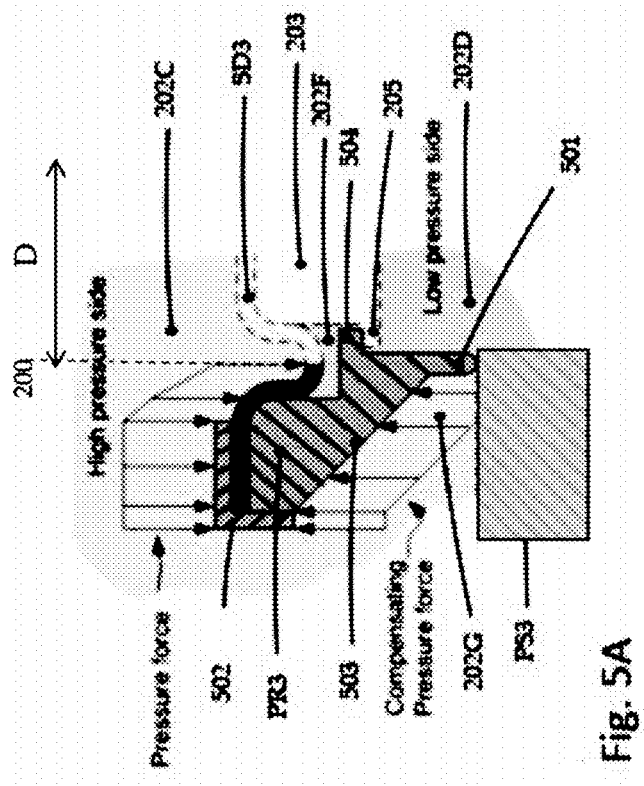
FIGS. 5A and 5B illustrate schematically examples of pressure-balanced poppet rings according to embodiments of the invention.
Figure 5B:
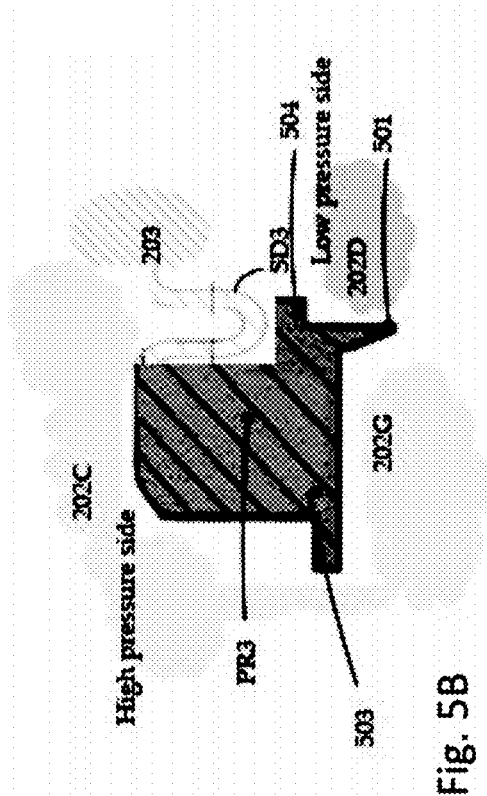

The poppet rings PR3 and PR4 are examples of pressure-balanced poppet-rings. Another example of a pressure-balanced poppet ring is illustrated in FIG. 5A. The exemplary poppet ring is illustrated when used in place of pressure-balanced poppet ring PR3, but similar poppet ring can be used in place of any of the poppet rings shown in FIGS. 2A, 2B, 2C, 3, 4A, 4B and 4C. In FIG. 5A the metering edge PR3/PS3 is shown in a closed position. The poppet ring PR3 is on the high pressure side (the supply pressure SP) in the supple pressure chamber 202C. The flexible sealing diaphragm SD3 may provide an air-tight sealing between the poppet ring PR3 and the stem 203, fixes the poppet ring PR3 to the stem 203 while allowing an axial relative movement of the poppet ring PR3 and the stem 203. The geometry of the poppet ring PR3 may be such that the effective metering edge PR3/PS3 is formed at a ring tip 501 that is relatively narrow in the radial direction. The middle point of the fold in the sealing diaphragm SD3 may be approximately aligned with the ring tip 501 in the axial direction (the vertical direction in FIG. 5A), as illustrated by a symmetry line 200 in FIG. 5A. At the opposite end of the poppet ring PR3 (the upper end in FIG. 5A) the radial width from the middle point of the fold of the sealing diaphragm SD3 outwards may define a predetermined upper surface area that determines the axial (downwards) pressure force exerted to the poppet ring PR3 subjected to the axial (downwards) pressure force due to the supply pressure SP. The geometry of the poppet ring PR3 may be selected so that the high pressure side is extended below the poppet ring up to the ring tip 501, as illustrated by a high pressure chamber 202G. The bottom surface 503 facing to the chamber 202G may be dimensioned so that the supply pressure SP affecting on the bottom surface of the poppet ring PR3 will provide a compensating axial (upward) pressure force which is approximately equal to the downward pressure force. Thereby the resultant pressure force affecting on the poppet ring PR3 is very small or zero on one side (left) of the symmetry line 200. On the low pressure side the low pressure may be present in a space 202F under the flexible diaphragm SD3 and above a radially inward-extending shoulder 504 of the poppet ring PR3. The dimensions of the shoulder 504 may be such that the downward pressure force caused by the low pressure fluid on the upper surface of the shoulder 504 will approximately compensate the upward pressure force caused by the low fluid pressure under the poppet ring PR3. Element 502 is an example of fixing the flexible sealing diaphragm SD3 to the poppet ring PR3. A similar poppet ring may be used in place of the poppet ring PR4 which is flexibly connected to the body 201. The profile of PR4 the may be a mirror image of that of shown in FIG. 5A. FIG. 5B illustrates a further example profile of a poppet ring (PR3 is shown as an example).

In an exemplary embodiment, the pilot force F_pil may be provided by a pilot fluid pressure affecting on a pilot diaphragm 206 and a piston 207 arranged at one end of the stem 203. An elastic preloaded element 212, such as a spring arranged to the opposite end of the stem 203, may be provided to drive the valve to a safe position in the case of a failure, e.g. when the supply pressure SP or the electric power is lost.

In an exemplary embodiment, the counter force F_sup may be provided by a supply pressure SP affecting on a counter piston 203A arranged at the end of the stem 203, as illustrated in FIG. 3. The fluid pressure in a chamber 202C may be the supply pressure SP and the dimensioning of the counter piston 203A and/or the poppet ring PR3 may be employed to scale the counter force F_sup to be equal to the pilot force F_pil provided by the pilot pressure in the chamber 210 such that the axial net force F_tot is about zero in the center position. Deriving also the counter force F_sup from the supply pressure SP makes both the counter force F_sup and the pilot force F_pil to scale with the supply pressure SP which may vary, thus, providing a supply pressure-balanced construction.

An example of the forces in a balanced poppet-type valve assembly according exemplary embodiments will be examined below with reference to FIGS. 3 and 5A. Stem is actuated with pilot force F_pil and the counter force F_sup.

$$F\_tot = F\_pil - F\_sup$$

The supply pressure SP affects on the stem 203 through the area defined by the symmetry line 200 and having the diameter D, thereby providing a counter force F_sup $$F\_sup = A*p = \pi*(D/2)^2*SP$$

Supply pressure also affects on the area of the poppet ring PR3 outside the symmetry line 200, but in static situations this area starts and ends at same diameter (at the symmetry line 200), therefore total force from the area outside the symmetry line 200 is about 0 Newton.

However, the inventors have observed that, in dynamic situations where supply pressure fluid flows to actuator chamber 202D from the supply chamber 202C through an opening measuring edge PR3/PS3, the supply pressure SP may suddenly drop, which leads to drop in the axial counter force F_sup, and increase in the axial net force F_tot. Increasing the net force F_tot will move the stem 203 upward, thereby opening the measuring edge more and further dropping the supply pressure SP. This chain of event repeats until a new equilibrium is found. The movement of the stem 203 therefore becomes somewhat uncontrolled. In some circumstances the chain of events can repeat until the stem 203 is in fully open position. A controller, such as a valve positioner, is able to "pull back" the stem (by reducing F_pil with the pilot pressure control) as it notices too much air is moving. However, usually the controller is not able to do this fast and precise enough.

An aspect of the invention is to avoid uncontrolled or unstable of a movement of the stem in a fluid valve assembly.

According to an aspect of the invention, a supply chamber is divided into two different chambers, an outer supply chamber and an inner supply chamber, by a seal member. The inner chamber is used to actuate the stem while the outer chamber is connected to a supply pressure line and used to feed an actuator chamber. Means for stabilizing the supply pressure fluctuation in the inner chamber are also provided.

In FIGS. 6, 7 and 8, fluid valve assemblies 60 according to further exemplary embodiments are illustrated schematically in more detail. Basically the valve assembly 60 may include all features of the valve assembly 20 described above. FIG. 6 illustrates a valve assembly 60 which substantially identical to the valve assembly 20 in FIG. 3 except for some additional features. FIG. 7 illustrates a simplified and more schematic exemplary valve assembly 60 with some details left out. FIG. 8 illustrates a further schematic exemplary valve assembly 60 with different type of means for stabilizing the supply pressure fluctuation in the inner chamber. Same reference symbols in FIGS. 6, 7 and 8 as well as in FIGS. 2A, 2B, 2C, 3, 4A, 4B, 4C, 5A, and 5B refer to the same or corresponding elements, structures, functionalities and features, and same principles can be applied as described herein in connection with the fluid valve assembly 20.

In the exemplary embodiments shown in FIGS. 6, 7 and 8, a supply chamber is divided into two different chambers, an outer supply chamber 202C and an inner supply chamber 202E by a separating or seal member 603. The inner chamber 202E is used to actuate the stem 202 while the outer chamber 202C is connected to a supply pressure line (not shown) and used to feed an actuator chamber 202D. A dividing or separating wall, such as a seal holder 602, may be provided to surround an end portion of the stem 203, such as the counter piston portion 203A. The seal holder 602 may define a chamber with closed top end, while the stem 203 extends into the chamber from the bottom end of the chamber and is able to move axially within the chamber. At least a portion of the radial inner profile of the seal holder 602 may be arranged to closely or loosely fit to the radial outer profile of the counter piston 203A, and the fit is sealed by an annular seal member 603. In the exemplary embodiments illustrated in FIGS. 6 and 7, the inner surface of the seal holder 602 may be provided with an annular groove or an annular flange or any other structure that holds the seal member 603. Thereby the seal member 603 is stationary in relation to the axially moving stem 203. In the exemplary embodiments illustrated in FIGS. 6 and 7, the seal member 603 is a lip seal having a lip pressing against the outer surface of the counter piston 203A. However, any other type of seal or separating element may be used for the seal member 603, such as a ring seal, a sealing diaphragm, a sealing bellows, a tight fit, etc. Some air leakage may be allowed for the seal or separating member 603.

The top end of the counter piston 203A, the generally the end of the stem 203, that is arranged to move axially within the seal holder 602 and the seal member 603, has a mating outer surface for the seal member. The length of the mating outer surface in the axial direction is preferably at least the length of the axial movement or a stroke of the piston 203A. In exemplary embodiments of invention a recession may be provided at the top surface of the piston 203A for an elastic preloaded element 212, such as a spring arranged to the opposite end of the stem 203, which may be provided to drive the valve to a safe position in the case of a failure, e.g. when the supply pressure SP or the electric power is lost. Having the elastic element 212 partially within the stem 203 enables the strong enough elastic element 212 and long enough mating surface of the stem without need for any substantial increase in the axial dimension of the valve body 201. In the example shown in FIG. 6, an annular cylindrical flange 604 is provided to the top end of the piston 203A so that a recession for the elastic element 212 is defined. The outer radial surface of the flange 604 provides at least part of the mating surface of the piston 203A in the axial direction. In the exemplary embodiment illustrated in FIG. 7, a counter piston 203A with no recession or flange 604 is shown.

Alternatively, the stem 203, or more particularly the counter piston 203A, may be provided with a structure, such as a groove, for holding a seal member similar to the seal member 603. In such a case, the seal member will move axially with the counter piston 203 within the chamber defined by the dividing wall 602. The seal member, such as a lip of a lip seal, will be pressed on a mating inner surface of the dividing wall 602.

According to an aspect of the invention, fluctuation of a supply pressure SP retained in the inner chamber 202E is stabilized. In exemplary embodiments of the invention, a restricted flow path, such a restricted flow path 605 illustrated in FIGS. 6 and 7, may be provided between the inner supply chamber 202E and the outer supply chamber 202C (including a section of a supply pressure channel S close to the actual outer chamber 202C). Via the restricted flow path 605, sudden supply pressure fluctuations in the outer chamber 202C are removed from the inner chamber 202E, while slower or permanent supply pressure changes in the outer chamber 202C will pass through to the inner chamber 202E. Thus, a stabilized supply pressure in the inner chamber 202E may in a controlled and stable manner follow any fluctuation in the supply pressure in the outer chamber 202C, so that rapid uncontrolled movements or overshoots of the valve stem 203 can be avoided.

For example, the restricted flow path 605 may be arranged to lower the stabilized supply pressure SP retained in the inner supply pressure chamber 202E to the supply pressure SP in the outer supply pressure chamber with a predetermined rate, for example if the supply pressure in the outer chamber 202C suddenly drops when where supply pressure fluid flows to actuator chamber 202D from the outer supply chamber 202C trough an opening measuring edge PR3/PS3. Similarly the restricted flow path 605 may be arranged to raise the stabilized supply pressure SP retained in the inner supply pressure chamber 202E at a predetermined rate, if then supply pressure in the outer supply pressure chamber 202C is higher than the stabilized supply pressure retained in the inner supply pressure chamber. Also, at the first time supply pressure SP is applied to the valve assembly 60, the restricted flow path 605 will enable the supply pressure to get to the inner supply chamber 202E. Also if a user raises the supply pressure at some point of time, the restricted flow path 605 will enable the raised supply pressure to get to the inner supply chamber. Still further, if the user decreases supply pressure over time, the restricted flow path 605 will enable air to get out of the inner supply chamber in order to lower the supply pressure in the inner supply chamber too.

Referring to FIGS. 6 and 7, let us examine an example of the forces in a balanced poppet-type valve assembly with an outer supply pressure chamber and an inner chamber according to exemplary embodiments. The stem 203 is actuated with pilot force F_pil and the counter force F_sup.

$$F\_tot=F\_pil-F\_sup$$

Unlike in embodiments with a single supply chamber, the supply pressure affecting on the stem 203 is now the stabilized supply pressure retained in the inner chamber 202E. Again, the stabilized supply pressure SP affects on the stem 203 through the area defined by the symmetry line 200 and having the diameter D, thereby providing a counter force F_sup $$F\_sup=A*p=\pi*(D/2)^2*SP$$

Again, the stabilized supply pressure also affects on the area of the poppet ring PR3 outside the symmetry line 200, but in static situations this area starts and ends at same diameter (at the symmetry line 200), therefore total force from the area outside the symmetry line 200 is about 0 Newton.

However, in dynamic situations where supply pressure fluid flows to actuator chamber 202D from the supply chamber 202 through an opening measuring edge PR3/PS3 and the supply pressure SP in the outer chamber 202C suddenly drops, the stabilized supply pressure retains in the inner chamber substantially unchanged or constant. Therefore, the force F_sup affecting on the stem 203 stays substantially unchanged or constant, which means that the stem 203 and and the measuring edge PR3/PS3 also stay in place until the pilot force F_pil is altered. There is no need for a controller to "pull back" the stem 203 at times, and so the controller should be able to execute a more aggressive control strategy than with embodiments having one supply pressure chamber.

In some embodiments, the restricted flow path 605 may comprise a narrower or smaller-diameter section 605A, referred to as a flow restrictor, such as a restriction orifice (RO), as illustrated in FIG. 9. The area (i.e. the diameter) of the restriction orifice determines the rate of flow at the outlet of a given process fluid for the specified pressure and temperature. The restriction orifice is mainly used to achieve controlled or restricted flow of process medium. The orifice offers a restriction to the process flow and the pressure head drops from the upstream to the downstream. In exemplary embodiments, the restriction orifice 605A may preferably have an orifice diameter of from about 0.1 mm to about 0.5 mm, more preferably from about 0.2 mm to about 0.3 mm. In its simplest form the restricted flow path 605 or the restrictor orifice may comprise a small hole in the dividing wall or the seal holder 602, a small hole or gap between structures, e.g. between the valve body 201 and the dividing wall 602, a designed leakage point at the seal member 603, etc. The restrictor may be a separate element that is inserted to the valve body 201 or the dividing wall 602. This allows to produce very small-diameter orifices with special tools and technology, and then insert a ready-made restrictor into larger hole or channel in the valve body 201 or the dividing wall 602, for example. A part of the restricted flow path 605 and/or the restrictor may also be arranged outside the valve body 201.

In some embodiments, the seal member 603 may be an annular lip seal which is configured to hold pressure only in one direction, like a check valve. The lip seal 603 may be arranged to seal the inner supply chamber 202E from the outer supply chamber 202C, if the pressure in the outer supply chamber 203C drops below the stabilized supply pressure retained in the inner supply chamber 202E (the lip is pressed against the mating surface by the pressure difference), and arranged to pass the supply pressure from the outer supply chamber 202C to the inner supply chamber 202E to raise the stabilized supply pressure retained in the inner supply chamber 202E, if the supply pressure in the outer supply chamber 202C is higher than the stabilized supply pressure retained in the inner supply chamber 202E (the lip is disengaged from the mating surface by the pressure difference). With such arrangement, the flow is restricted in direction from the inner chamber to the outer chamber. Such arrangement may be made regardless of the way of implementation of the restricted flow path 605.

In an embodiment, a supply path 805A with a check valve 805 may be provided parallel with the restrictor 605 to provide the similar effect as provided by the lip seal, as illustrated in FIG. 8. Alternatively, any other type of flow control device may be used that is configured to hold pressure only in one direction. However, such one-directional flow restriction may also cause rapid undesired movements of the stem, especially if the pilot force F_pil and the counter force F_sup are formed from the same supply pressure. Therefore, such arrangement is not preferred in many applications.

In an embodiment, a prestage PR may be provided which controls a pilot pressure in the pilot pressure chamber 210 and thereby the axial pilot force, as schematically illustrated in FIGS. 10A and 10B. The prestage PR may control the pilot pressure in the pilot pressure chamber 210 by, for example, controlling with a valve or flap which amount of the supply pressure air is shunted to the environment, and which amount of the air is directed to the pilot pressure chamber 210 via the pilot pressure inlet 906. The lowest pilot pressure may be obtained then the flap or valve is in its open position, which may correspond to a predetermined restriction orifice, such as 0.5 mm in diameter. When a flap or valve is driven in closing direction, the restriction orifice becomes smaller and the pilot pressure raises, and finally the flap or valve is in its closed position with smallest or zero restriction orifice and the highest pilot pressure. Typically, the supply pressure supplied to the prestage PR may be restricted to prescale the supply pressure for a desired control range of the pilot pressure. The flow restriction for setting the control range may correspond to a 0.2 mm restrictor orifice, for example.

In an embodiment, such an exemplary embodiment illustrated in FIG. 10A a r restricted flow path 905 may be provided from the outer supply chamber 202C (including the supply pressure inlet S close to the outer supply chamber 202C) to the prestage PR. The restricted flow path 905 may also implement the flow restriction of the supply pressure for setting the control range of the pilot pressure. The restricted flow path 905 may comprise a narrower or smaller-diameter section 905A which may be implemented with similar way as the restrictor 605. By means of the restricted flow path 905, fluctuation of a supply pressure SP at the prestage PR is stabilized. By means of the restricted flow path 905, sudden supply pressure fluctuations in the outer chamber 202C are removed from the supply pressure at the prestage PR and from the pilot pressure retained in the which in the pilot pressure chamber 210, while slower or permanent supply pressure changes in the outer chamber 202C will pass through to the pilot pressure chamber 210. The restricted flow path 605 and the further restricted flow path 905 may be dimensioned so that the change in the supply pressure SP in the outer chamber 202C will affect at similar rate to the counter force F_sup through the inner supply chamber 202E and to the pilot force F_pilot through the pilot pressure chamber, so that the change in the net force F_tot is zero or very small. If there was a difference in the rates with which the counter force F_sup and the pilot force F_pilot changed, there would be force peaks in the net force F_tot and undesired movements of the stem 203. In an embodiment, such an exemplary embodiment illustrated in FIG. 10B, a supply flow path 1005 with a check valve 1005A may be provided from the outer supply chamber 202C (including the supply pressure inlet S close to the outer supply chamber 202C) to the inner supply chamber 202E. Alternatively, any other type of flow control device 1005A may be used that is configured to hold pressure only in one direction. The check valve 1005A may be configured to block the flow from the inner supply chamber 202E to the outer supply chamber 202C, if the pressure in the outer supply chamber 203C drops below the stabilized supply pressure retained in the inner supply chamber 202E, and arranged to pass the supply pressure from the outer supply chamber 202C to the inner supply chamber 202E to raise the stabilized supply pressure retained in the inner supply chamber 202E, if the supply pressure in the outer supply chamber 202C is higher than the stabilized supply pressure retained in the inner supply chamber 202E. With such arrangement, the flow is restricted in direction from the inner chamber to the outer chamber. Further, a restricted flow path 905 may be provided from the inner supply chamber 202E (including the supply flow path 1005 section between the check valve 1005A and the inner supply chamber 202E) to the prestage PR. The restricted flow path 905 may also implement the flow restriction of the supply pressure for setting the control range of the pilot pressure. The restricted flow path 905 may comprise a narrower or smaller-diameter section 905A which may be implemented as a restrictor, for example as illustrated in FIG. 9. With the restricted flow path 905 being connected to the inner supply chamber 202E, a supply pressure SP at the prestage PR follows the stabilized supply pressure in the inner supply chamber, and the axial net force F_tot is not affected by the supply pressure fluctuations. Sudden supply pressure drops in the outer chamber 202C are removed not only from the inner supply chamber 202E but also from the supply pressure at the prestage PR and from the pilot pressure retained in the pilot pressure chamber 210. As the prestage PR gradually leaks pressure to the environment, the stabilized supply pressure in the inner supply chamber 202E will gradually decrease below the supply pressure in the outer chamber 202C, and the check valve 1005A will again pass the supply pressure from the outer supply chamber 202C to the inner supply chamber 202E. Thus, any further restricted flow path, such as the flow path 605 in FIG. 10A may not be needed.

Embodiments of the invention can be applied in control of any fluid-pressure operated actuators. Embodiments of the invention are particularly applicable in control of actuators of process devices, such as control valves, shut-off valves, screens, etc., in any automation system for any industrial process and the like.

Figure 11:
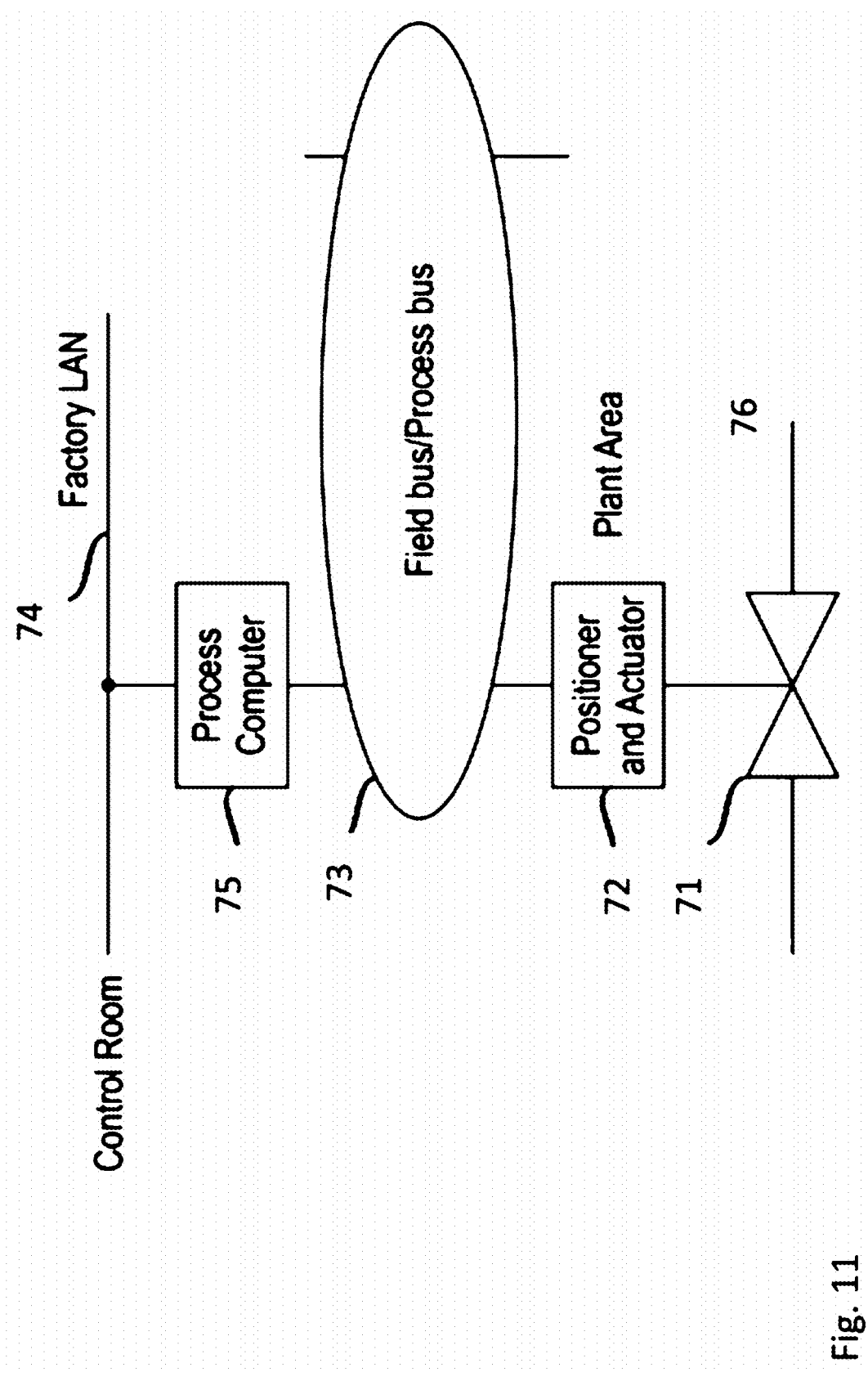
FIG. 11 illustrates a schematic block diagram of an exemplary process automation system.

FIG. 11 shows a schematic block diaphragm of an exemplary process automation system wherein the principles of the invention may be applied in a valve positioner. The control system block 75 generally represents any and all control room computer(s)/programs and process control computer(s)/programs as well as databases, which may be interconnected by a factory LAN 74, in the automation system. There are various architectures for a control system. For example, the control system may be a Direct Digital Control (DDC) system or Distributed Control System (DCS), both well known in the art.

In the example of FIG. 11, only one controlled process valve is shown, but an automation system may, however, include any number of field devices, such as control valves, often hundreds of them. There are various alternative ways to arrange the interconnection between the control system and field devices, such as control valves, in a plant area. In FIG. 10, the field/process bus 73 generally represents any such interconnection. Traditionally, field devices have been connected to the control system by two-wire twisted pair loops, each device being connected to the control system by a single twisted pair providing a 4 to 20 mA analog input signal. More recently, new solutions, such as Highway Addressable Remote Transducer (HART) protocol, that allow the transmission of digital data together with the conventional 4 to 20 mA analog signal in the twisted pair loop have been used in the control systems. The HART protocol is described in greater detail for example in the publication HART Field Communication Protocol: An Introduction for Users and Manufacturers, HART Communication Foundation, 1995. The HART protocol has also been developed into an industrial standard. Examples of other fieldbuses include Foundation Fieldbus and Profibus PA. However, it is to be understood that the type or implementation of the field/process bus 73 is not relevant to the present invention. The field/process bus 73 may be based on any one of the alternatives described above, or on any combination of the same, or on any other implementation.

A process valve 71 and a positioner/actuator 72 may be connected to a process to control the flow of a substance in process pipeline 76. The material flow may contain any fluid material, such as fluids, liquors, liquids, gases and steam.

Figure 12:
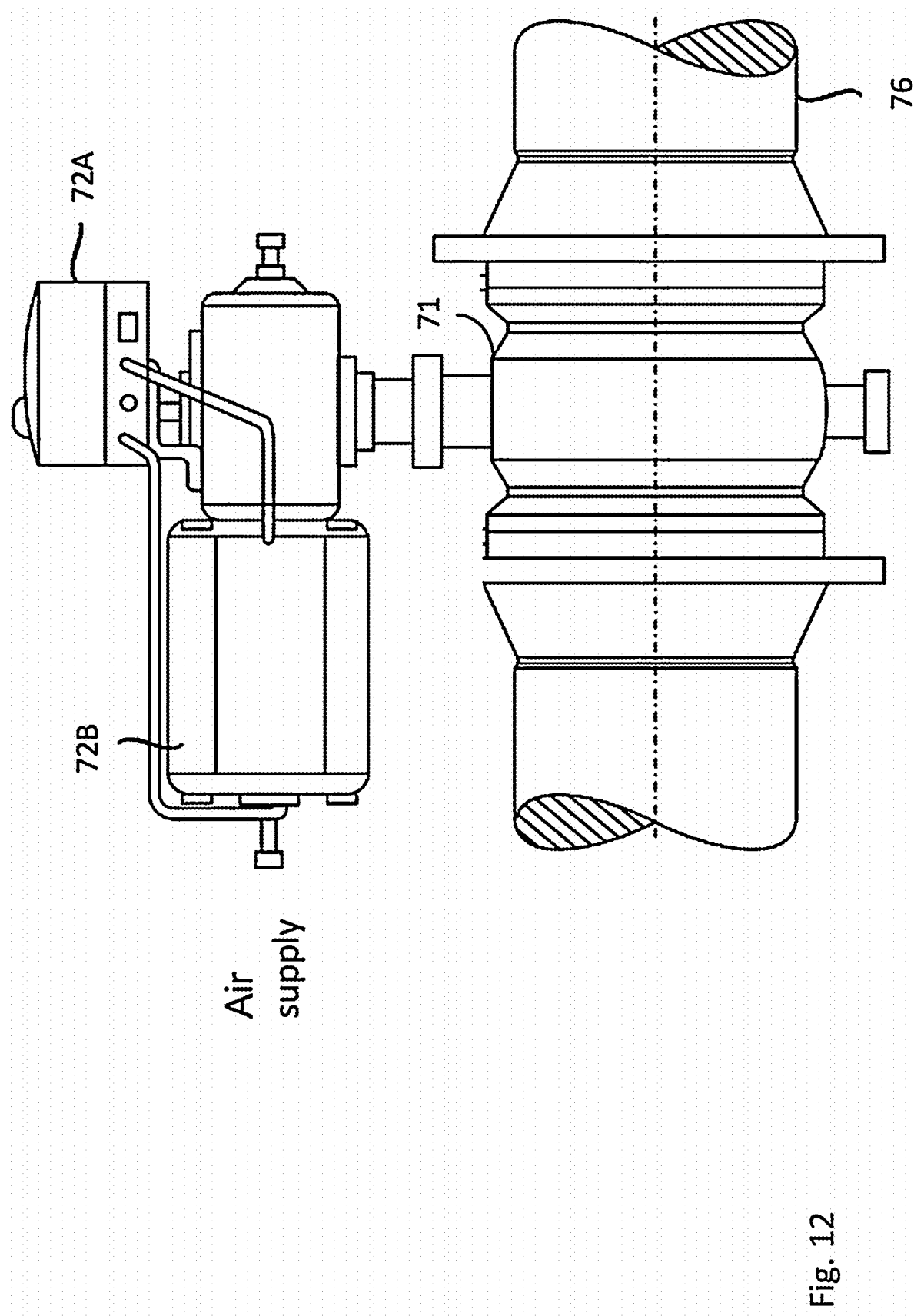
FIG. 12 illustrates an exemplary arrangement wherein a pneumatic actuator operates the process valve under control of the valve positioner.

FIG. 12 illustrates an exemplary arrangement wherein a pneumatic actuator 72B operates the process valve 71 under control of the valve positioner 72A. An example of a process valve 71 is Neles® RotaryGlobe control valve from Metso Corp. An example of a valve positioner 72A wherein embodiments of the invention may be applied is Neles® ND9000 intelligent valve controller from Metso Corp. An example of an actuator 72B is Quadra-Powr X series pneumatic actuator from Metso Corp.

The operation of an intelligent valve controller, such as valve controller 72A, may be based on a microcontroller, such as a microprocessor (μP), which controls the position of the valve on the basis of control information obtained from the field connection line or fieldbus 73. The valve controller is preferably provided with valve position measurement, in addition to which it is possible to measure many other variables, such as supply pressure for pressurized air, pressure difference over actuator piston or temperature, which may be necessary in the self-diagnostics of the valve or which the valve controller transmits as such or as processed diagnostic information to the control room computer, process controller, condition monitoring computer or a similar higher-level unit of the automation system via a field bus.

Figure 13:
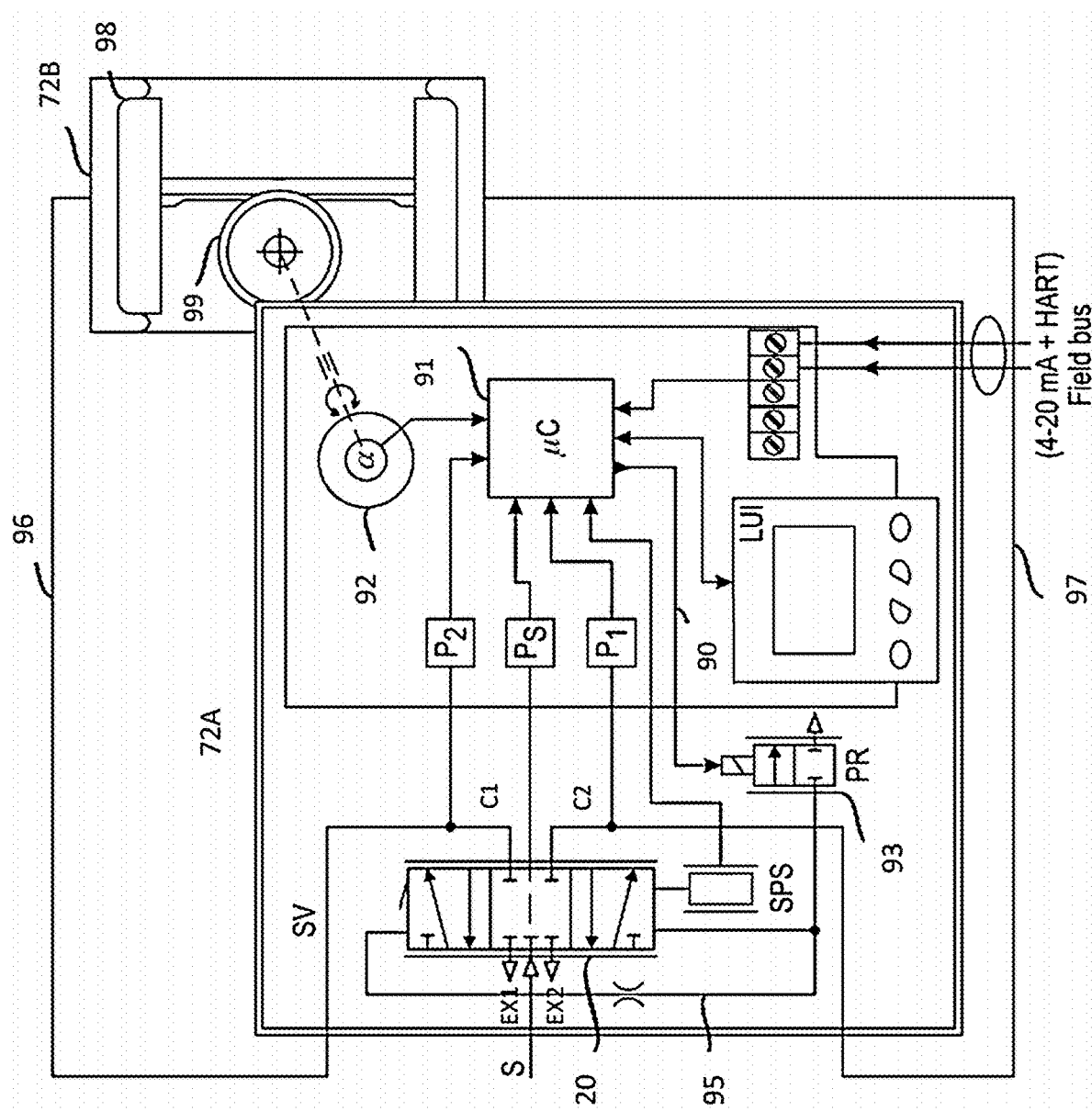
FIG. 13 shows a schematic block diagram of an exemplary intelligent valve controller wherein a fluid valve assembly according to embodiments of the invention may be applied.

An example block diagram of microcontroller-based intelligent valve controller, such as valve controller 72A, is illustrated in FIG. 13. The exemplary valve controller is described for double-acting actuator but similarly, a valve controller for single-acting actuator can be implemented by using the 3/2 valve assembly 60 according to embodiments of the invention in place of the 5/3 valve assembly 20 and removing unnecessary structures and functionalities.

A controller may include an electronic unit 91 having an electrical control output 90 and a pneumatic unit 20, 93 that takes in the electrical control signal 90 and converts it to a corresponding fluid pressure output P1,P2 at actuator ports C1, C2 connected to an actuator 72B. The pneumatic unit may comprise a prestage 93 and an output stage 20. The output stage 20 may be any fluid valve assembly 20 for a double-acting actuator according to embodiments of the invention. The prestage 93 performs an electric-to-pressure (I/P) conversion of the electrical control signal 90 into a small pilot pneumatic control signal 95 which is sufficient to control the output stage 20. The supply port S of the output stage 20 is connected to a supply air pressure. The output stage 20 amplifies the small pneumatic pilot signal into a larger pneumatic pressure output signals 96,97 at the actuator ports C1,C2. The device may contain a Local User Interface (LUI) enabling local configuration. A microcontroller 11 controls the valve position. To that end, the microcontroller 91 may receive an input signal (a set point) over a process/fieldbus 93, such as 4-20 mA pair and HART, and may perform various measurements. The device may be powered from a 4-20 mA or fieldbus. The microcontroller 91 may read the input signal and a valve position sensor 92. The microcontroller may also read one or more of a supply pressure sensor Ps, a first actuator pressure sensor P1, a second actuator pressure sensor P2, and an output stage position sensor SPS. A difference between the set point defined by the input signal and the position measured by the position sensor 92 may be detected by means of a control algorithm inside the microcontroller 91. The microcontroller 91 calculates a new value for prestage (PR) coil current 90 based on the information from the input signal and from the sensor(s). Changed current 90 to the PR changes the pilot pressure 95 to the output stage 20. The pilot pressure 95 moves the stem 203 of the output stage and the actuator pressures at the actuator ports C1 and C2 change accordingly, as described with regard to embodiments of the invention above. When the pilot pressure 95 is at a predetermined value, the stem 203 is centered and all flow channels through the metering edges (poppet rings) are closed, the actuator 72B stays in place. When the pilot pressure 95 rises from the predetermined value, the stem 203 moves in the positive direction and air flows from the supply port S to the actuator port C2 and further therefrom to one side (lower side) of a double diaphragm actuator 72B, the opposite side of the double diaphragm actuator 72B being vented through the actuator port C1 to the exhaust port X1. The actuator moves in fully open (100%) direction. More specifically, the increasing pressure will move the diaphragm piston 98 upwards. The actuator and feedback shaft 99 rotate. The position sensor 92 measures the rotation for the microcontroller 91. The microcontroller 91 modulates the PR-current 90 from the steady state value until a new position of the actuator 90 according to the input signal is reached. The movement (travel) of the control valve in the opposite direction is obtained by causing the stem 203 move to the opposite direction (downwards, in the 0% direction) by decreasing the pilot pressure 95, so that the actuator port C2 is connected to the exhaust port EX2 and the actuator port C1 is connected to the pneumatic supply port S. It should be appreciated that the illustrated valve controller is merely an example and the invention is not limited any specific implementation of a valve controller.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A fluid valve assembly for connection to a supply of fluid under pressure for providing an actuator with an actuator fluid pressure, the fluid valve assembly comprising:
 a valve body with a central bore, the central bore comprising: a supply pressure chamber connected to a supply pressure input line for receiving a supply of fluid under pressure; an actuator chamber connected to an actuator pressure line for providing a control fluid pressure to an actuator; and an exhaust chamber connected to a pressure exhaust line for venting the control fluid pressure from the actuator chamber;
 a stem axially-movable within said central bore and actuated by an axial pilot force and an axial counter force affecting on the stem;
 a metering edge and a counteracting metering edge arranged coaxially with and controlled by the stem and arranged to control fluid flow from the supply pressure chamber to the actuator chamber and from the actuator chamber to the exhaust chamber, respectively;
 a seal member arranged coaxially with the stem to divide the supply pressure chamber into an outer supply pressure chamber and an inner supply pressure chamber,
 the inner supply pressure chamber being arranged to actuate the stem by the supply pressure providing the axial counter force affecting on the stem within the inner supply pressure chamber, and the outer supply pressure chamber being connected to the supply pressure input line and arranged to feed the actuator chamber; and
 a flow restrictor element arranged in a supply pressure flow path between the inner supply pressure chamber and the outer supply pressure chamber and configured to restrict rapid changes in the supply pressure in the inner chamber, the flow restrictor element being configured to prevent propagation of rapid changes of the supply pressure from the outer supply pressure chamber through the supply pressure flow path to the inner supply pressure chamber and to thereby prevent uncontrolled axial movements of the stem.

2. A fluid valve assembly as claimed in claim 1, wherein the restrictor element configured to restrict rapid changes in the supply pressure in the inner chamber comprise a restricted flow path between the inner supply pressure chamber and the outer supply pressure chamber.

3. A fluid valve assembly as claimed in claim 2, wherein the restricted flow path is arranged to lower the stabilized supply pressure retained in the inner supply pressure chamber to the supply pressure in the outer supply pressure chamber with a predetermined rate.

4. A fluid valve assembly as claimed in claim 2, wherein the restricted flow path is arranged to raise the stabilized supply pressure retained in the inner supply pressure chamber at a predetermined rate, if the supply pressure in the outer supply pressure chamber is higher than the stabilized supply pressure retained in the inner supply pressure chamber.

5. A fluid valve assembly as claimed in claim 2, wherein the restricted flow path comprises a flow restrictor.

6. A fluid valve assembly as claimed in claim 5, wherein the flow restrictor is a flow orifice restrictor.

7. A fluid valve assembly as claimed in claim 2, wherein the seal member is an annular lip seal arranged to seal the inner supply pressure chamber from the outer supply pressure chamber, if the pressure in the outer supply pressure chamber drops below the stabilized supply pressure retained in the inner supply pressure chamber, and arranged to pass the supply pressure from the outer supply pressure chamber to the inner supply pressure chamber to raise the stabilized supply pressure retained in the inner supply pressure chamber, if the supply pressure in the outer supply pressure chamber is higher than the stabilized supply pressure retained in the inner supply pressure chamber.

8. A fluid valve assembly as claimed in claim 2, comprising a further restricted flow path from a supply pressure inlet of the outer supply pressure chamber to a prestage which controls a pilot pressure and thereby the axial pilot force.

9. A fluid valve assembly as claimed in claim 8, wherein the restricted flow path and the further restricted flow path are dimensioned so that a rate of change of the axial counter force and the rate of change of the pilot force due to a change in the supply pressure in the outer supply pressure chamber are approximately equal.

10. A fluid valve assembly as claimed in claim 1, wherein the restrictor element configured to restrict rapid changes in the supply pressure in the inner chamber comprises a flow control device configured to block a supply pressure flow path between the inner supply chamber and the outer supply chamber, if the pressure in the outer supply chamber drops below the stabilized supply pressure retained in the inner supply chamber, and arranged to open the supply pressure flow path otherwise.

11. A fluid valve assembly as claimed in claim 1, wherein the seal member comprises a lip seal, a ring seal, a sealing diaphragm or sealing bellows.

12. A fluid valve assembly as claimed in claim 1, wherein the restrictor element configured to restrict rapid changes in the supply pressure in the inner chamber comprises a flow control device configured to block a supply pressure flow path between the inner supply chamber and the outer supply chamber, if the pressure in the outer supply chamber drops below the stabilized supply pressure retained in the inner supply chamber, and arranged to open the supply pressure flow path otherwise.

13. A fluid valve assembly as claimed in claim 1, wherein the restrictor element configured to restrict rapid changes in the supply pressure in the inner chamber comprises a flow control device configured to block a supply pressure flow path between the inner supply chamber and the outer supply chamber, if the pressure in the outer supply chamber drops below the stabilized supply pressure retained in the inner supply chamber, and arranged to open the supply pressure flow path otherwise, and comprising a restricted flow path from the inner supply pressure chamber to a pre-stage which controls a pilot pressure and thereby the axial pilot force.

14. A fluid valve assembly as claimed in claim 1, wherein one of the metering edge and the counteracting metering edge comprises a poppet ring supported by a flexible element to the stem and a respective mating seat surface on the valve body, and another one of the metering edge and a counteracting metering edge comprises a poppet ring supported by a flexible element to the valve body and a respective mating seat surface on the stem, a support arrangement allowing a relative axial movement of the poppet ring and the valve body or the poppet ring and the stem also in a closed state of the respective metering edge.

15. A fluid valve assembly as claimed in claim 14, wherein each flexible element comprises a respective sealing element.

16. A process valve positioner comprising:
an electronic unit with an electrical control output; and
a pneumatic or hydraulic unit arranged to convert the electrical control output to a corresponding control fluid pressure to the actuator, the pneumatic or hydraulic unit comprising:
a valve body with a central bore, the central bore comprising supply pressure chamber connected to a supply pressure input line for receiving a supply of fluid under pressure; an actuator chamber connected to an actuator pressure line for providing the control fluid pressure to the actuator; and an exhaust chamber connected to a pressure exhaust line for venting the control fluid pressure from the actuator chamber;
a stem axially-movable within said central bore and actuated by an axial pilot force and an axial counter force affecting on the stem;
a metering edge and a counteracting metering edge arranged coaxially with and controlled by the stem and arranged to control fluid flow from the supply pressure chamber to the actuator chamber and from the actuator chamber to the exhaust chamber, respectively;
a seal member arranged coaxially with the stem to divide the supply pressure chamber into an outer supply pressure chamber and an inner supply pressure chamber,
the inner supply pressure chamber being arranged to actuate the stem by the supply pressure providing the axial counter force affecting on the stem within the inner supply pressure chamber, and the outer supply pressure chamber being connected to the supply pressure input line and arranged to feed the actuator chamber; and
a flow restrictor element arranged in a supply pressure flow path between the inner supply pressure chamber and the outer supply pressure chamber and configured to restrict rapid changes in the supply pressure in the inner chamber, the flow restrictor element being configured to prevent propagation of rapid changes of the supply pressure from the outer supply pressure chamber through the supply pressure flow path to the inner supply pressure chamber and to thereby prevent uncontrolled axial movements of the stem.

17. A process valve positioner according to claim 16, wherein the pneumatic or hydraulic unit comprises a prestage and an output stage including the fluid valve assembly, the prestage being arranged to convert the electrical control output into a pilot pressure which is sufficient to control the output stage.

* * * * *